Figure 1:
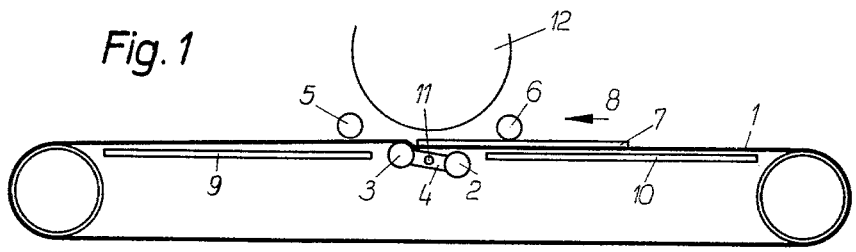

Sept. 28, 1965                  P. ERNST                3,208,187

APPARATUS FOR WORKING ON PLATE-SHAPED WORKPIECES
IN CONJUNCTION WITH A MACHINING TOOL

Filed Dec. 10, 1963

Inventor
Paul Ernst
By
Lowry & Rinehart
ATTYS.

# United States Patent Office 3,208,187
Patented Sept. 28, 1965

3,208,187
APPARATUS FOR WORKING ON PLATE-SHAPED WORKPIECES IN CONJUNCTION WITH A MACHINING TOOL
Paul Ernst, 16 Kandelstrasse, Eschelbronn, Germany
Filed Dec. 10, 1963, Ser. No. 329,475
8 Claims. (Cl. 51—76)

This invention relates to a device for automatically pressing plate-shaped workpieces against and removing them from a machining tool.

In the case of roller grinding and smoothing machines which are to be used for smoothing raw or lacquered parts of furniture, the grinding roller must be as soft as possible so that it can smooth out slight unevennesses in the surface of a wooden workpiece. If furniture parts ground with such rollers are fed past under the rollers by a conveyor belt or the like, in particular for lacquer polishing, the lacquer film or the thin veneer layer is ground through at the beginning and at the end of the workpiece, thereby rendering the workpiece unfit for use. To avoid this, devices are known in which the rollers are automatically brought into contact with the workpiece only when the front edge has already passed under the roller. In the same way the roller is again lifted off the workpiece before the trailing edge thereof passes under the roller. In this manner both edges are protected against damage. Such devices are however very expensive because photoelectric cells or contacts are necessary for sensing the beginning and end of the workpiece. Furthermore the roller must be electro-mechanically raised aid lowered.

It is the object of the present invention to overcome the above-mentioned disadvantages and to simplify the known devices by using known weight or spring-loaded pressure rollers for pressing the workpiece against a conveyor belt.

The invention provides a device for automatically pressing plate-shaped workpieces against and removing them from a working tool of the type including grinding and polishing rollers, after the leading edge of the workpiece has run under and before the trailing edge thereof has run out from under the working tool, said device comprising a conveyor belt for carrying the workpiece under the working tool, pressure rollers pressing the workpiece on to said conveyor belt, a rocking element with two arms pivotable about a pivot axle arranged underneath the conveyor belt and axially parallel with the working roller, and two rotatable guide rollers mounted one in each of said arms and bearing against the underside of said conveyor belt.

The rocking element may also be so constructed that it consists of two guide rollers mounted in the same plane and a deflection roller arranged below said two guide rollers, the three rollers forming a unit capable of swinging about a common pivot axle.

Such a device is suitable for use on all types of roller machines, such as for example grinding and polishing, brushing, buffing, cleaning machines and the like. Belts or roller beds also come into question as conveying means. In the latter case the rocking element forms part thereof.

Figure 2:
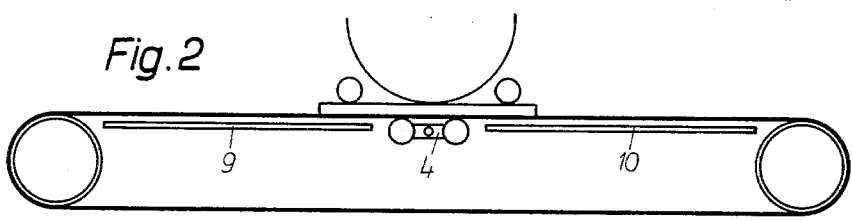
Figure 3:
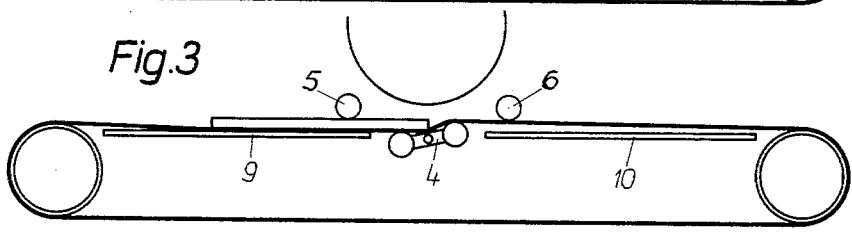
Figure 4:
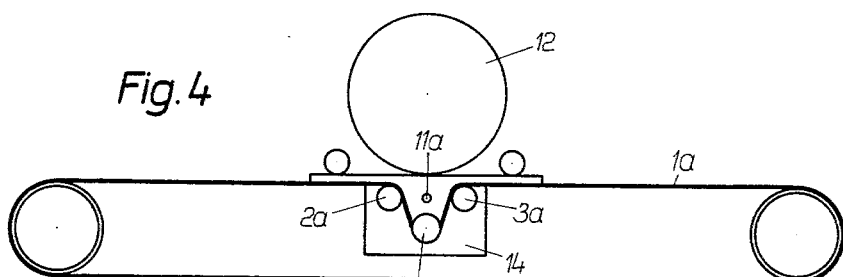
Figure 5:
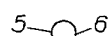
Figure 6:
Figure 7:

Several preferred embodiments of the invention will now be described by way of example and with reference to the accompanying drawing, in which:

FIGS. 1 to 3 show a device according to the invention in three different working positions, FIG. 4 shows a rocking arrangement of modified construction, and FIGS. 5, 6, and 7 are schematic views illustrating various mechanisms for applying pressure to a workpiece operated upon by the device of this invention.

FIG. 1 shows a conveyor belt 1 arranged to run over two rotatable rollers 2 and 3. These two rollers are connected by a rocking element 4. This rocking element 4 is pivotable about an axle 11. Two weight- or spring-loaded pressure rollers 5 and 6 press a workpiece 7 against the conveyor belt 1 which, when loaded, slides on rigid tables 9 and 10 and passes under a working roller 12 serving, for example, for grinding or polishing.

The device operates in the following manner: The workpiece 7 runs through the machine in the direction of the arrow 8 and passes under the working roller 12. The workpiece 7 is thereby pressed on to the conveyor belt 1 by the weight-loaded pressure roller 6. The conveyor belt 1 slides on the rigid table 10. As it moves forward the workpiece 7 first reaches the roller 2 mounted in the rocking element 4 and presses this downwards with the result that the rocking element 4 turns about the axle 11 and the rollers 2 and 3 assume the positions shown in FIG. 1. As it continues its forward movement the workpiece 7 in approaching the roller 3 is brought gradually into contact with the working roller 12 and on reaching the roller 3 presses this downwards until the rocking element 4 is brought back into the position parallel with the tables 9 and 10 shown in FIG. 2. The workpiece 7 then runs under the pressure roller 5 which presses it on to the conveyor belt 1 so that it continues its forward movement. When the rear end of the workpiece 7 has passed over the roller 2, it will press the roller 3 still lower with the result that the rocking element 4 will turn about the pivot axle 11 and bring the rollers 2 and 3 into the position shown in FIG. 3, thereby removing the extreme rear edge of the workpiece from the working roller 12 and saving it from damage.

In the construction illustrated in FIG. 4 the conveyor belt 1a is guided over the rollers 3a and 2a as well as round a guide roller 13. The three rollers 3a, 2a and 13 are mounted at each end in a common plate 14. These plates 14 are in turn mounted on a pivot axles 11a so that the three rollers can turn about this point 11a. This arrangement is preferred in the case of relatively stiff conveyor belts.

The pressure rollers 5 and 6 can, if desired or found necessary, be loaded to increase the pressure extended by the rollers 5 and 6 by a variety of different mechanisms. For example, in FIG. 5 a weight is shown applied to either or both of the rollers 5, 6. A spring (FIG. 6) or pneumatically or hydraulically operable means (FIG. 7) may be employed in lieu of the weight of FIG. 5 to increase the load operated by the rollers 5, 6 upon the workpiece.

The device proposed by the invention makes it possible for the workpiece to be pressed against the working tool, for example the roller 12, only when the front edge of the workpiece has already passed the line of contact of the roller, and is moved away from this roller 12 before the trailing edge of the workpiece has reached this line of contact. Thus both the front edge and also the rear edge are protected against damage during the working operation.

I claim:

1. A device for automatically pressing plate-shaped workpieces against and removing them from a working tool after the leading edge of the workpiece has run under and before the trailing edge thereof has run out from under the working tool, said device comprising a conveyor belt for carrying the workpiece under the working tool, pressure rollers pressing the workpiece on to said conveyor belt, a rocking element with two arms pivotable about a pivot axle arranged underneath the conveyor belt and axially parallel with the working roller, and two rotatable guide rollers mounted one in each of said arms and bearing against the underside of said conveyor belt.

2. A device according to claim 1, wherein the rocking element consists of two guide rollers mounted in the same plane and a deflection roller arranged below said two guide rollers, the three rollers forming a unit capable of swinging about a common pivot axle.

3. A device for automatically pressing plate-shaped workpieces against and removing them from a working tool after the leading edge of the workpiece has run under and before the trailing edge thereof has run out from under the working tool, said device comprising means for transporting the workpiece under the working tool, means for urging the workpiece upon the transporting means, and means beneath said transporting means and cooperative therewith to maintain the workpiece in contact with the working tool at all times but relieving the working pressure between the working tool and the workpiece both upon the introduction of a leading edge of the workpiece to the working tool and the departure of a trailing edge of the workpiece beyond the working tool, said last mentioned means comprising an arm mounted for tilting movement about an axis parallel to the direction of workpiece travel, means being provided for tilting said arm about an axis substantially medially thereof, and anti-friction means carried by opposite end portions of said arm.

4. A device for automatically pressing plate-shaped workpieces against and removing them from a working tool after the leading edge of the workpiece has run under and before the trailing edge thereof has run out from under the working tool, said device comprising means for transporting the workpiece under the working tool, means for urging the workpiece upon the transporting means, and means beneath said transporting means and cooperative therewith to maintain the workpiece in contact with the working tool at all times but relieving the working pressure between the working tool and the workpiece both upon the introduction of a leading edge of the workpiece to the working tool and the departure of a trailing edge of the workpiece beyond the working tool, said last mentioned means comprising a member mounted for tilting movement about an axis parallel to the direction of workpiece travel, and anti-friction means carried by said member to augment the movement of the workpiece toward and beyond the working tool by the transporting means, means being provided for tilting said member about an axis substantially medially thereof, and said anti-friction means including at least a single anti-friction element arranged at each side of said axis relative to the direction of workpiece travel.

5. A device for automatically pressing plate-shaped workpieces against and removing them from a working tool after the leading edge of the workpiece has run under and before the trailing edge thereof has run out from under the working tool, said device comprising means for transporting the workpiece under the working tool, means for urging the workpiece upon the transporting means, and means beneath said transporting means and cooperative therewith to maintain the workpiece in contact with the working tool at all times but relieving the working pressure between the working tool and the workpiece both upon the introduction of a leading edge of the workpiece to the working tool and the departure of a trailing edge of the workpiece beyond the working tool, said last mentioned means comprising an arm mounted for tilting movement about an axis parallel to the direction of workpiece travel, said transporting means including a conveyor belt, and said arm being mounted beneath an upper conveyor belt run of said conveyor belt.

6. A device for automatically pressing plate-shaped workpieces against and removing them from a working tool after the leading edge of the workpiece has run under and before the trailing edge thereof has run out from under the working tool, said device comprising means for transporting the workpiece under the working tool, means for urging the workpiece upon the transporting means, and means beneath said transporting means and cooperative therewith to maintain the workpiece in contact with the working tool at all times but relieving the working pressure between the working tool and the workpiece both upon the introduction of a leading edge of the workpiece to the working tool and the departure of a trailing edge of the workpiece beyond the working tool, said last mentioned means comprising a member mounted for tilting movement about an axis parallel to the direction of workpiece travel, and anti-friction means carried by said member to augment the movement of the workpiece toward and beyond the working tool by the transporting means, said transporting means including a conveyor belt, and said member being mounted beneath an upper conveyor belt run of said conveyor belt.

7. A device for automatically pressing plate-shaped workpieces against and removing them from a working tool after the leading edge of the workpiece has run under and before the trailing edge thereof has run out from under the working tool, said device comprising means for transporting the workpiece under the working tool, means for urging the workpiece upon the transporting means, and means beneath said transporting means and cooperative therewith to maintain the workpiece in contact with the working tool at all times but relieving the working pressure beneath the working tool and the workpiece both upon the introduction of a leading edge of the workpiece to the working tool and the departure of a trailing edge of the workpiece beyond the working tool, said last mentioned means including at least two anti-friction elements, and said transporting means being a conveyor belt having a belt run contacting both of said elements.

8. The device as defined in claim 7 including a third anti-friction element about which said belt run is partially entrained.

References Cited by the Examiner

UNITED STATES PATENTS 1,988,577    1/35    Scrimgeour _____ 51—78 X

FOREIGN PATENTS 904,697    2/54    Germany.

LESTER M. SWINGLE, *Primary Examiner*.